US012665216B2

(12) United States Patent
Fukunaga

(10) Patent No.: US 12,665,216 B2
(45) Date of Patent: Jun. 23, 2026

(54) MANUFACTURING METHOD OF SECONDARY BATTERY

(71) Applicant: PRIME PLANET ENERGY & SOLUTIONS, INC., Tokyo (JP)

(72) Inventor: Masao Fukunaga, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 657 days.

(21) Appl. No.: 18/070,752

(22) Filed: Nov. 29, 2022

(65) Prior Publication Data

US 2023/0170520 A1     Jun. 1, 2023

(30) Foreign Application Priority Data

Nov. 30, 2021     (JP) ................................. 2021-194886

(51) Int. Cl.
H01M 10/04 (2006.01)
H01M 50/103 (2021.01)
(Continued)

(52) U.S. Cl.
CPC ..... H01M 10/0431 (2013.01); H01M 50/103 (2021.01); H01M 50/186 (2021.01);
(Continued)

(58) Field of Classification Search
CPC ........... H01M 10/0431; H01M 50/186; H01M 50/417; H01M 50/461; H01M 50/103; H01M 50/491; H01M 50/609
See application file for complete search history.

(56) References Cited

U.S. PATENT DOCUMENTS

2014/0356659 A1     12/2014     Kado
2015/0263376 A1      9/2015     Kondo et al.
(Continued)

FOREIGN PATENT DOCUMENTS

CN          105122531 A     12/2015
CN          107004812 A      8/2017
(Continued)

OTHER PUBLICATIONS

Non-Final Office Action issued in U.S. Appl. No. 18/070,785, dated Jan. 23, 2025.
(Continued)

*Primary Examiner* — Stewart A Fraser
*Assistant Examiner* — Patrick Marshall Greene
(74) *Attorney, Agent, or Firm* — Finnegan, Henderson, Farabow, Garrett, and Dunner, LLP

(57) ABSTRACT

A herein disclosed manufacturing method of a secondary battery is a manufacturing method of a secondary battery that includes a wound electrode assembly and a battery case. The herein disclosed manufacturing method of the secondary battery comprising: an arranging step for arranging the plural wound electrode assemblies inside the battery case; a peeling step for peeling off at least one, among the positive electrode and the negative electrode, and the separator; and a liquid injection step for performing a liquid injection of the electrolyte solution into the battery case. At the peeling step, at least one, among the positive electrode and the negative electrode of each wound electrode assembly, and the separator are peeled off to make a state where a peeled area is formed on each of the plural wound electrode assemblies.

7 Claims, 7 Drawing Sheets

(51) Int. Cl.
H01M 50/186 (2021.01)
H01M 50/417 (2021.01)
H01M 50/46 (2021.01)
H01M 50/491 (2021.01)
H01M 50/609 (2021.01)

(52) U.S. Cl.
CPC ....... H01M 50/417 (2021.01); H01M 50/461 (2021.01); H01M 50/491 (2021.01); H01M 50/609 (2021.01)

(56) References Cited

U.S. PATENT DOCUMENTS

| 2016/0087304 | A1 | 3/2016 | Tsukui | |
| 2017/0256821 | A1* | 9/2017 | Suzuki | H01G 11/74 |
| 2017/0338459 | A1 | 11/2017 | Nakahiro et al. | |
| 2019/0165424 | A1 | 5/2019 | Aritomo et al. | |
| 2020/0313241 | A1 | 10/2020 | Ueda et al. | |
| 2021/0249649 | A1* | 8/2021 | Baba | H01M 50/446 |
| 2023/0095738 | A1 | 3/2023 | Kondou et al. | |
| 2024/0275002 | A1 | 8/2024 | Sugimoto et al. | |

FOREIGN PATENT DOCUMENTS

| CN | 109478677 | A | 3/2019 |
| CN | 111164814 | A | 5/2020 |
| JP | H 06140077 | A | 5/1994 |
| JP | 2001-319641 | A | 11/2001 |
| JP | 2011-034859 | A | 2/2011 |
| JP | 2014-212060 | A | 11/2014 |
| JP | 2017-098114 | A | 6/2017 |
| JP | 2017-163126 | A | 9/2017 |
| JP | 2018-185899 | A | 11/2018 |
| JP | 2021-136209 | A | 9/2021 |
| JP | 2021-144888 | A | 9/2021 |
| WO | WO99/31751 | A1 | 6/1999 |
| WO | WO 2021/024563 | A1 | 2/2021 |
| WO | WO 2021/182513 | A1 | 9/2021 |

OTHER PUBLICATIONS

Final Office Action issued in U.S. Appl. No. 18/070,785, dated Jul. 8, 2025.

Notice of Allowance issued in U.S. Appl. No. 18/070,785, dated Dec. 3, 2025.

* cited by examiner

MANUFACTURING METHOD OF SECONDARY BATTERY

CROSS REFERENCE TO RELATED APPLICATIONS

The present application claims priority from Japanese Patent Application No. 2021-194886 filed on Nov. 30, 2021, which is incorporated by reference herein in its entirety.

BACKGROUND

The present disclosure relates to a manufacturing method of a secondary battery.

A secondary battery, such as a lithium ion secondary battery, includes, for example, a wound electrode assembly in which a positive electrode formed in a strip-like shape and a negative electrode formed in a strip-like shape are wound via a separator formed in a strip-like shape, includes an outer package which is provided with an opening and configured to accommodate the wound electrode assembly and an electrolyte solution, and includes a sealing plate which is configured to seal the opening of the outer package, and then the secondary battery is configured with the outer package and the sealing plate being sealed. Japanese Patent Application Publication No. 2018-185899 discloses a method for performing a liquid injection of the electrolyte solution into the case in which the electrode assembly is disposed.

SUMMARY

Anyway, recently, for implementing a higher capacity, it is discussed to accommodate plural wound electrode assemblies in one battery case. According to the results of intensive investigations by the present inventors, it has been found that when a plurality of wound electrode assemblies are provided in one battery case, impregnation of the electrolytic solution may become uneven among the wound electrode assemblies, and the liquid injection property a whole of the battery The present disclosure has been made to solve the above-described problem, to provide a method for manufacturing a secondary battery having a higher capacity and an enhanced liquid injection property for a whole of the battery.

A herein disclosed manufacturing method of a secondary battery is a manufacturing method of the secondary battery including a wound electrode assembly and a battery case. The wound electrode assembly is formed in a flat shape, and in the wound electrode assembly, a positive electrode and a negative electrode are wound via a separator. The battery case is configured to accommodate a plural number of the wound electrode assemblies. The manufacturing method includes an arranging step for arranging the plural number of the wound electrode assemblies inside the battery case, a peeling step for peeling off at least one, among the positive electrode and the negative electrode of each of the plural number of the wound electrode assemblies, and the separator, and a liquid injection step for performing a liquid injection of an electrolyte solution into the battery case. At the peeling step, at least one, among the positive electrode and the negative electrode of each wound electrode assembly, and the separator are peeled off to induce a state where a peeled area is formed on each of the plurality of the wound electrode assemblies.

As described above, in the peeling step, by peeling off at least one of the positive electrode and the negative electrode of each wound electrode assembly and the separator so that the peeled area is formed in each of the plurality of wound electrode assemblies are accommodated, the plurality of wound electrode assemblies are likely to be uniformly impregnated with the electrolyte solution, it becomes easy to make the electrolyte be uniformly impregnated to the plural wound electrode assemblies in the secondary battery in which the plural wound electrode assemblies are accommodated. Thus, it is possible to manufacture a secondary battery that includes plural wound electrode assemblies, has a higher capacity, is configured to suppress the electrolyte solution from being not-uniformly impregnated to the plural wound electrode assemblies, and has an enhanced liquid injection property for a whole of the battery.

In one aspect of the herein disclosed manufacturing method, adhesion layers are formed on both surfaces of the separator. Additionally, in an aspect where the adhesion layers are formed, at the arranging step, the positive electrode and the separator may be adhered by the adhesion layer, and the negative electrode and the separator may be adhered by the adhesion layer. Then, the separator may include a base material layer that is porous and made from polyolefin resin, and the adhesion layer may include polyvinylidene fluoride (PVdF).

In one suitable aspect of the herein disclosed manufacturing method, a width of the negative electrode may be equal to or more than 20 cm. In addition, the battery case may include a square shape outer package including a bottom wall, a pair of first side walls that extend from the bottom wall and are opposed mutually, a pair of second side walls that extend from the bottom wall and are opposed mutually, and an opening that is opposed to the bottom wall, and may include a sealing plate configured to seal the opening. Then, at the arranging step, the wound electrode assembly may be disposed such that a wound axis of the wound electrode assembly is oriented along the bottom wall.

One aspect of the herein disclosed manufacturing method may include an initial charging step for performing an initial charge of the secondary battery in a state where the secondary battery is restricted, after the liquid injection step.

DETAILED DESCRIPTION

Below, while referring to drawings, some preferred embodiments for a herein disclosed technique w % ill be explained. Incidentally, the matters other than matters particularly mentioned in this specification and required for practicing the present disclosure (for example, a general configuration and manufacturing process for the battery by which the present disclosure is not restricted) can be grasped as design matters of those skilled in the art based on the related art in the present field. The present disclosure can be executed based on the contents disclosed in the present specification, and the technical common sense in the present field. Incidentally, a wording "A to B" representing a range in the present specification semantically covers not only a meaning of being equal to or more than A and equal to or less than B, but also meanings of "preferably more than A" and "preferably less than B".

Incidentally, in the present specification, the "battery" is a term widely denoting an electric storage device capable of taking out the electric energy, and is a concept containing the primary battery and the secondary battery. In addition, in the present specification, the "secondary battery" is a term widely denoting an electric storage device capable of repeatedly charging and discharging, and is a concept containing so called storage batteries (chemical batteries), such as a lithium ion secondary battery and a nickel hydrogen battery, and containing capacitors (physical batteries), such as an electric double layer capacitor.

Figure 1:
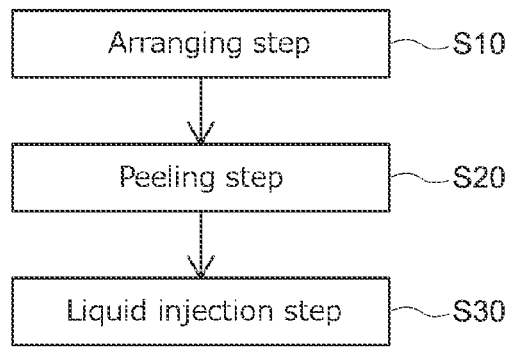
FIG. 1 is a flowchart view that shows a manufacturing method of a secondary battery in accordance with one embodiment.

Below, one embodiment will be described a herein disclosed manufacturing method of a secondary battery. FIG. 1 is a flowchart view that shows the manufacturing method of the secondary battery in accordance with the present embodiment. As shown in FIG. 1, the herein disclosed manufacturing method of the secondary battery includes (1) an arranging step S10 for arranging plural wound electrode assemblies in a battery case, (2) a peeling step S20 for peeling off at least one, among a positive electrode and a negative electrode included by each of the plural wound electrode assemblies, and a separator, and (3) a liquid injection step S30 for performing a liquid injection of an electrolyte solution into the battery case. The herein disclosed manufacturing method of the secondary battery may further include an initial charging step for performing an initial charge on the secondary battery after the liquid injection step S30. The herein disclosed manufacturing method of the secondary battery is characterized by peeling off at least one, among the positive electrode and the negative electrode of each wound electrode assembly, and a separator, to induce a state where a peeled area is formed on each of the plural wound electrode assemblies, at the peeling step S20. In other words, the herein disclosed manufacturing method is characterized by peeling off at least one, among the positive electrode and the negative electrode of each wound electrode assembly, and a separator at the peeling step S20, to make each of the plural wound electrode assemblies generate a gap between at least one, among the positive electrode and negative electrode, and the separator at an approximately same rate. Therefore, the other manufacturing processes may be like conventional ones, and the herein disclosed manufacturing method may further include another step at an arbitrary stage.

1. Configuration of Secondary Battery

Figure 2:
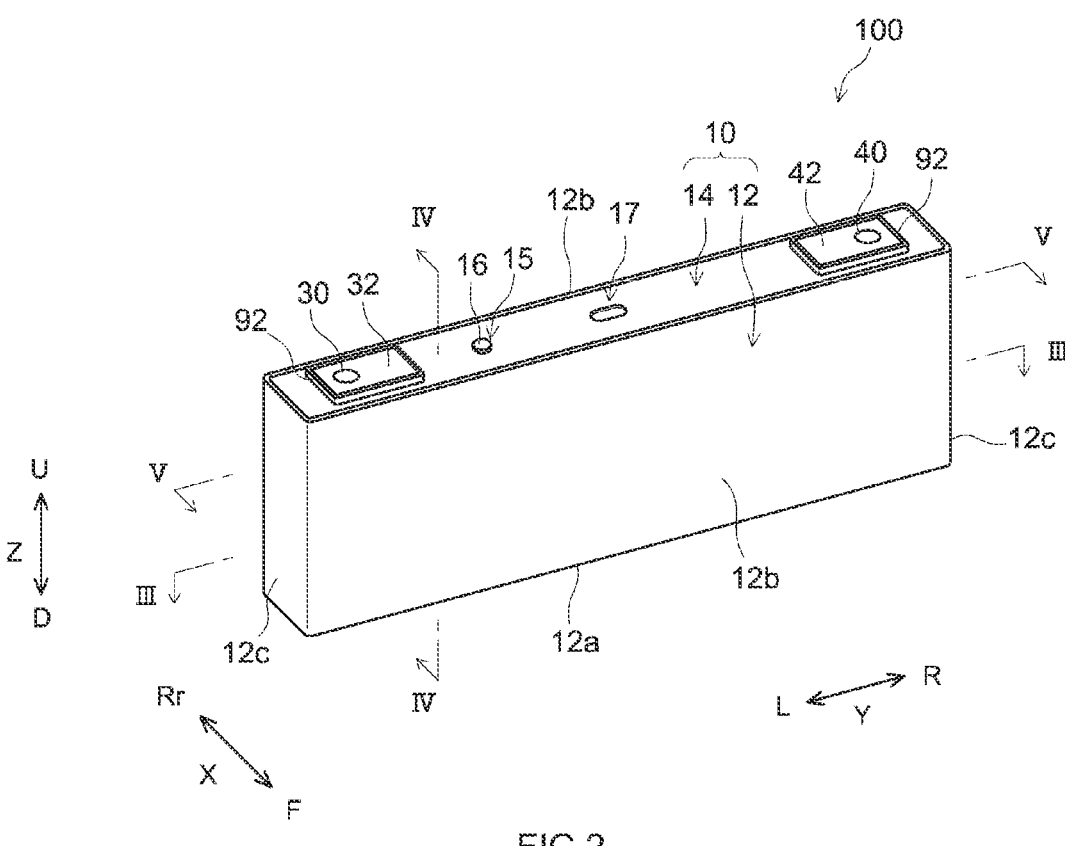
FIG. 2 is a perspective view that schematically shows a battery in accordance with one embodiment.
Figure 3:
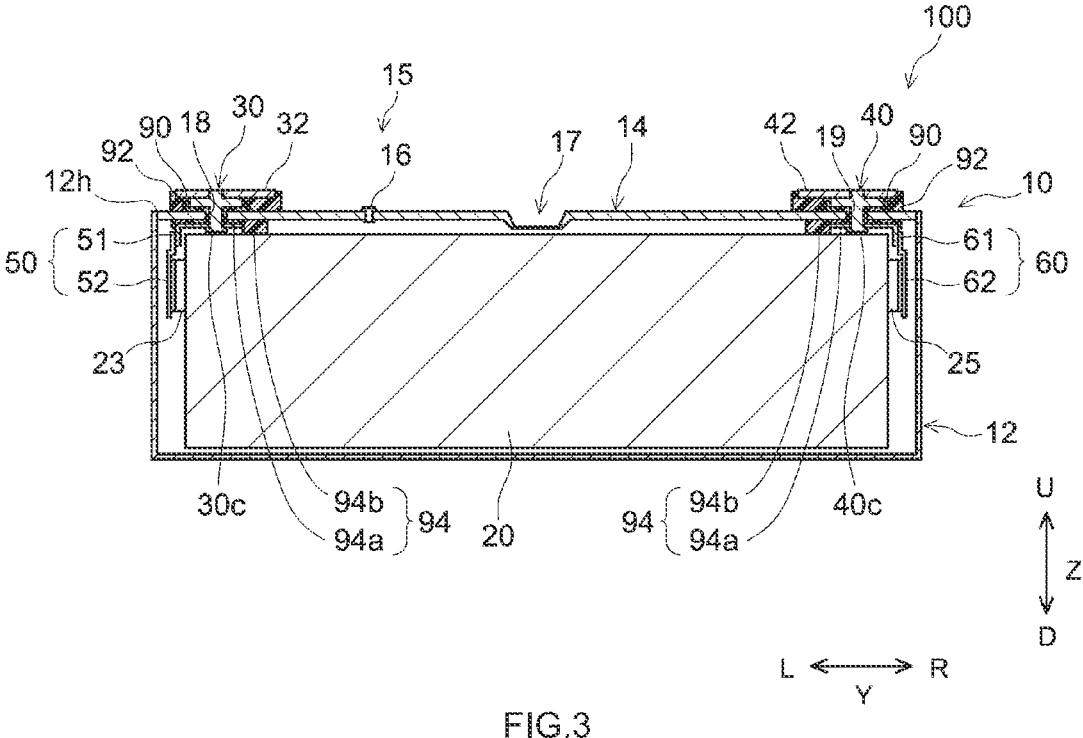
FIG. 3 is a longitudinal cross section view that is schematically shown along a III-III line of FIG. 2.
Figure 4:
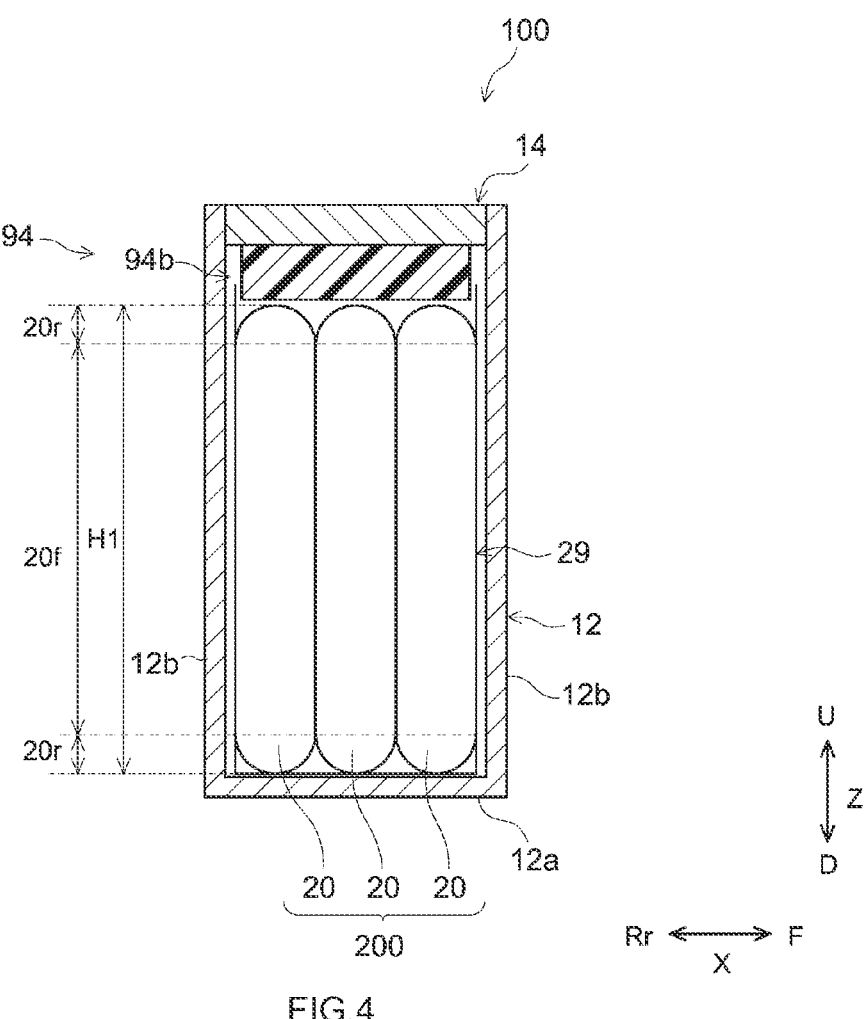
FIG. 4 is a longitudinal cross section view that is schematically shown along a IV-V line of FIG. 2.
Figure 5:
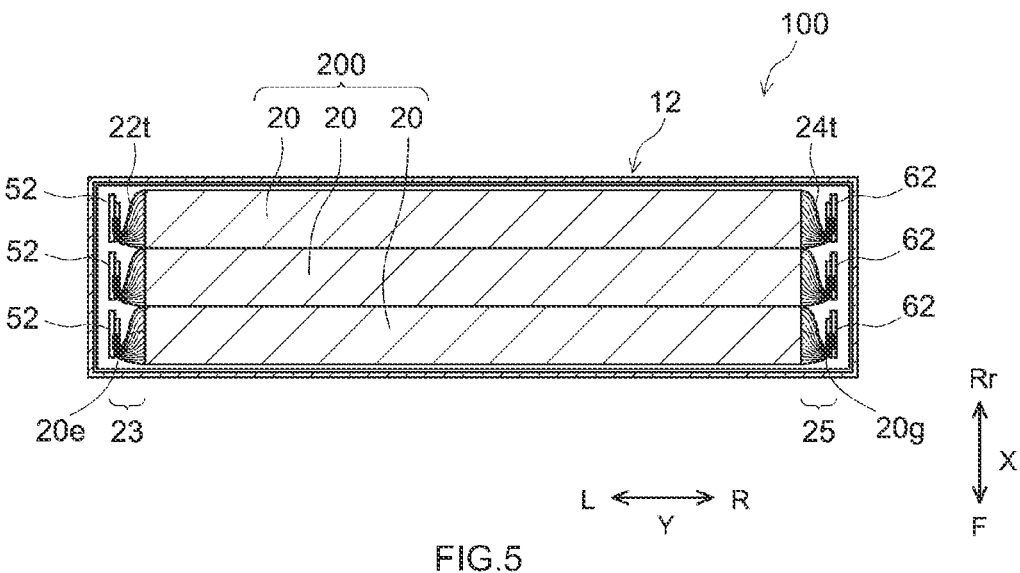
FIG. 5 is a lateral cross section view that is schematically shown along a V-V line of FIG. 2.
Figure 6:
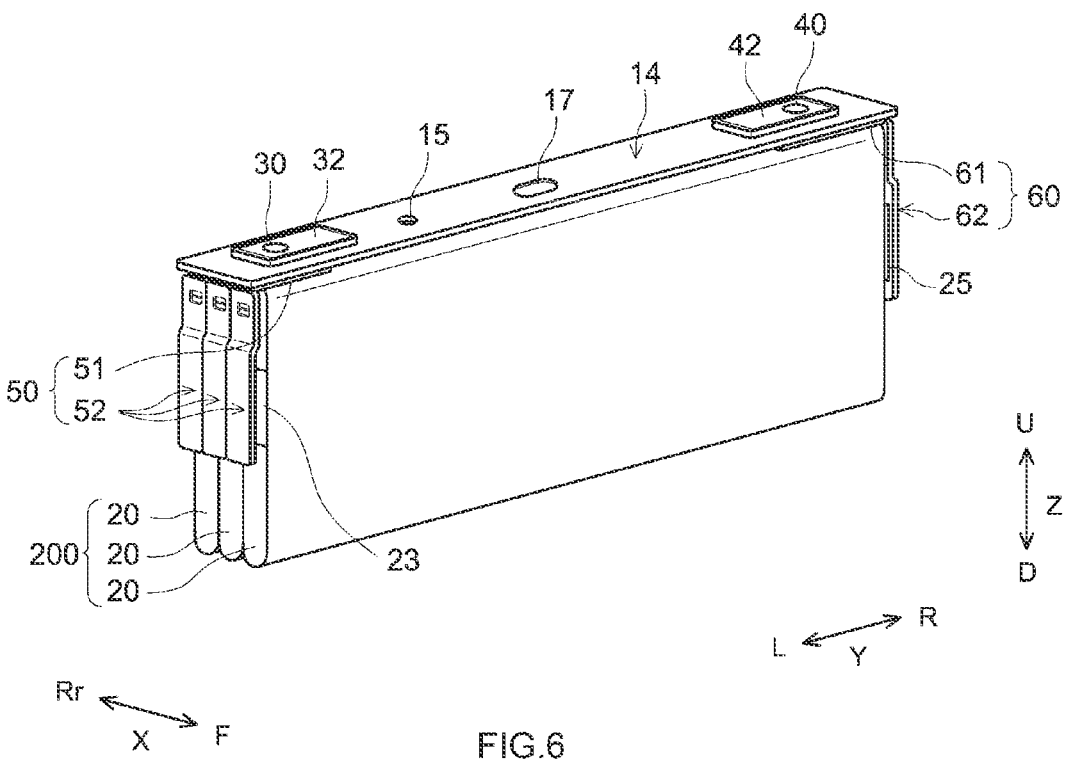
FIG. 6 is a perspective view that schematically shows an electrode assembly group attached to a sealing plate.
Figure 7:
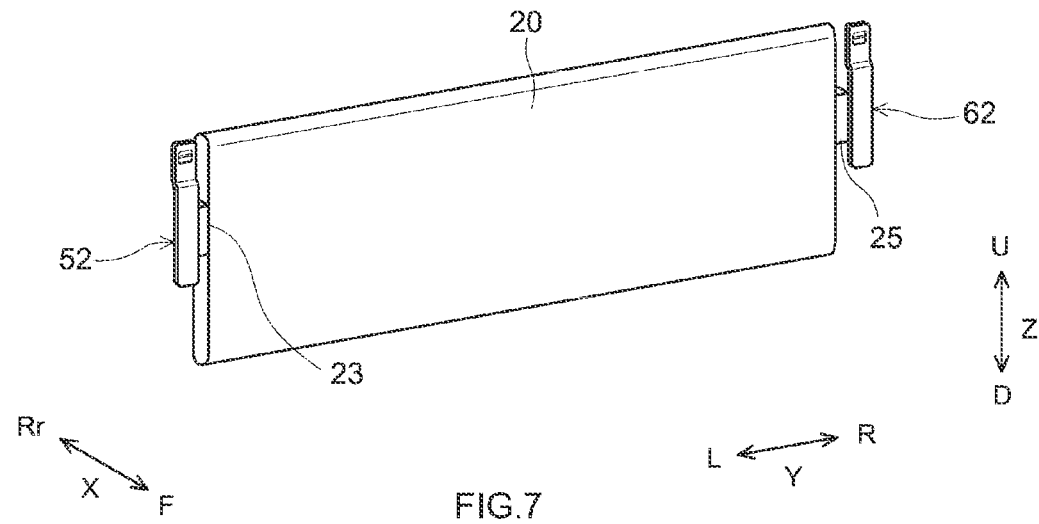
FIG. 7 is a perspective view that schematically shows a wound electrode assembly to which a positive electrode second electrical collector part and a negative electrode second electrical collector part are attached.
Figure 8:
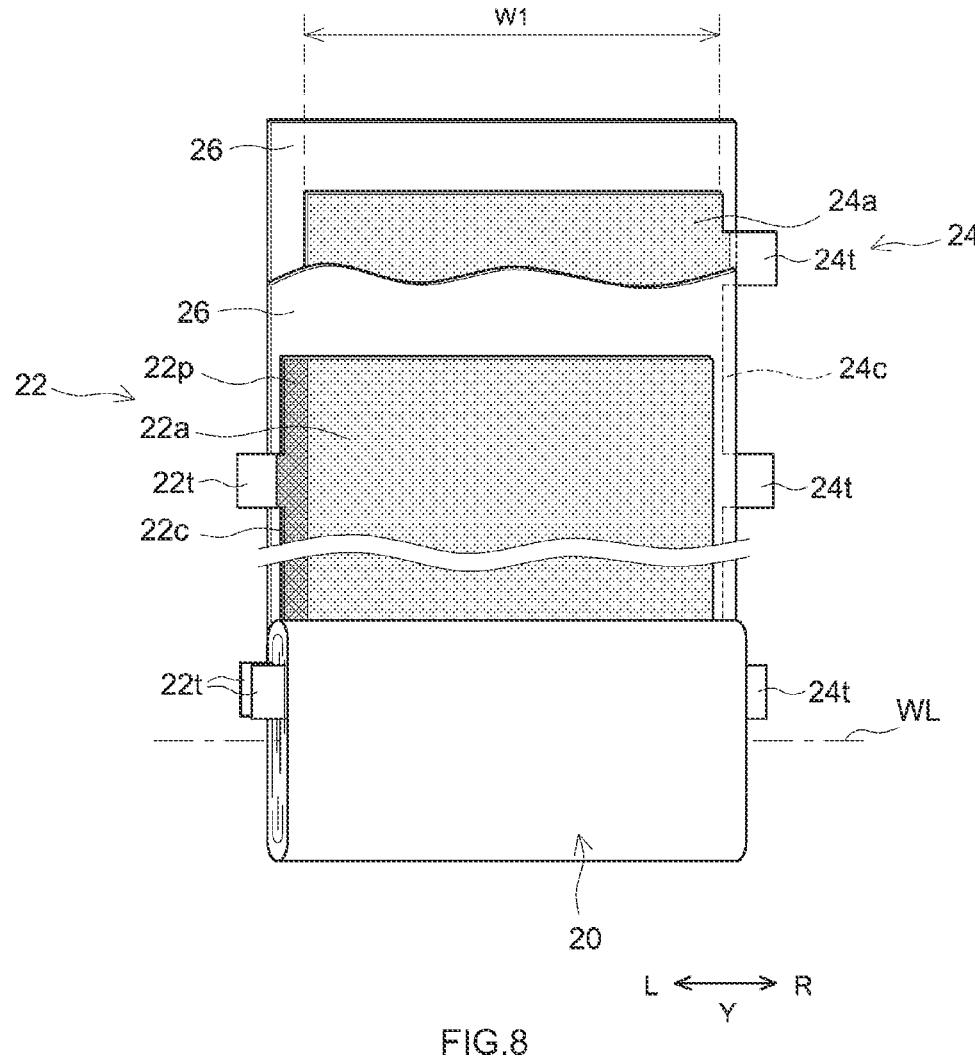
FIG. 8 is a schematic view that shows a configuration of a wound electrode assembly in accordance with one embodiment.

First, a configuration of the secondary battery 100 to be manufactured will be described, and then each step will be described. FIG. 2 is a perspective view of the secondary battery 100. FIG. 3 is a longitudinal cross section view that is schematically shown along a III-III line of FIG. 2. FIG. 4 is a longitudinal cross section view that is schematically shown along a IV-IV line of FIG. 2. FIG. 5 is a lateral cross section view that is schematically shown along a V-V line of FIG. 2. FIG. 6 is a perspective view that schematically shows an electrode assembly group attached to the sealing plate. FIG. 7 is a perspective view that schematically shows the wound electrode assembly to which a positive electrode second electrical collector part and a negative electrode second electrical collector part are attached. FIG. 8 is a schematic view that shows a configuration of the wound electrode assembly 20. In the explanation described below, reference signs L. R, F, Rr, U, and D in drawings respectively represent left, right, front, rear, up, and down, and reference signs X, Y, and Z in drawings respectively represent a short side direction, a long side direction orthogonal to the short side direction, and a vertical direction of the secondary battery 100. However, these are directions for convenience of explanation, and the arrangement of the secondary battery 100 is not limited.

As shown in FIG. 2 to FIG. 4, the secondary battery 100 manufactured by the herein disclosed manufacturing method includes a battery case 10, an electrode assembly group 200 including plural wound electrode assemblies 20, a positive electrode terminal 30, a negative electrode terminal 40, a positive electrode collecting member 50, and a negative electrode collecting member 60. As the illustration is omitted, the secondary battery 100 here further includes an electrolyte solution. The secondary battery 100 here is a lithium ion secondary battery.

(1) Battery Case

The battery case 10 is a housing configured to accommodate the electrode assembly group 200. The battery case 10 here has an outer appearance that is formed in a flat and bottomed rectangular parallelopiped shape (square shape). A material of the battery case 10 may be the same as a material conventionally used, and is not particularly restricted. It is preferable that the battery case 10 is made of metal, or it is further preferable that, for example, the battery case is made of aluminum, aluminum alloy, iron, iron alloy, or the like. As shown in FIG. 3, the battery case 10 includes an outer package 12 including an opening 12*h*, and includes a sealing plate (lid body) 14 configured to cover the opening 12*h*. It is preferable that the battery case 10 includes a slight dimensional space (clearance) in a thickness direction (short side direction X) of the outer package 12 after the electrode assembly group 200 is accommodated. By doing this, it is possible to secure a space for allowing increase in a thickness (length in the short side direction X) of the electrode assembly group 200 when the positive electrode plate 22 and the negative electrode plate 24 of each of the plural wound electrode assemblies 20 and the separator 26 are peeled off at a later described peeling step S20.

As shown in FIG. 2, the outer package 12 includes a bottom wall 12*a*, a pair of longer side walls 12*b* that extend from the bottom wall 12*a* and are opposed mutually, and a pair of shorter side walls 12*c* that extend from the bottom wall 12*a* and are opposed mutually. The bottom wall 12*a* is formed in an approximately rectangular shape. The bottom wall 12*a* is opposed to the opening 12*h*. An area of the shorter side wall 12*c* is smaller than an area of the longer side wall 12*b*.

The sealing plate 14 is attached to the outer package 12 to cover the opening 12h of the outer package 12. The sealing plate 14 is opposed to the bottom wall 12a of the outer package 12. The sealing plate 14 is approximately rectangular in a plane view. As shown in FIG. 3, the sealing plate 14 is provided with a liquid injection hole 15, a gas exhaust valve 17, and two terminals taking out holes 18, 19. The terminal taking out holes 18, 19 are respectively provided at both ends of the sealing plate 14 in a long side direction Y. The terminal taking out holes 18, 19 penetrate the sealing plate 14 in a vertical direction Z. The terminal taking out holes 18, 19 respectively have inner diameters capable of inserting the positive electrode terminal 30 and the negative electrode terminal 40 before being attached to the sealing plate 14. The liquid injection hole 15 is for performing a liquid injection of the electrolyte solution at a later described liquid injection step. The liquid injection hole 15 is sealed by a sealing member 16. The gas exhaust valve 17 is configured to be broken when a pressure inside the battery case 10 becomes equal to or more than a predetermined value, to exhaust the gas inside the battery case 10 to the outside.

(2) Electrolyte Solution

As described above, the secondary battery 100 includes the electrolyte solution. The electrolyte solution may be the same as conventional one, and is not particularly restricted. The electrolyte solution is, for example, a nonaqueous electrolyte solution that contains a nonaqueous solvent and a supporting salt. The nonaqueous solvent contains, for example, carbonates, such as ethylene carbonate, dimethyl carbonate, and ethyl methyl carbonate. It is preferable that the nonaqueous type solvent contains a chain-like carbonate and a ring-shaped carbonate. The supporting salt is, for example, a fluorine-containing lithium salt, such as $LiPF_6$. The electrolyte solution may contain an additive agent, as needed.

(3) Electrode Terminal

The positive electrode terminal 30 and the negative electrode terminal 40 both are fixed to the sealing plate 14. The positive electrode terminal 30 is arranged at one side (left side in FIG. 2 and FIG. 3) in a long side direction Y of the sealing plate 14. The positive electrode terminal 30 as described above is electrically connected at an outside of the battery case 10 to a positive electrode outside conductive member 32 formed in a plate shape. It is preferable that the positive electrode terminal 30 is made of metal, or it is further preferable that the positive electrode terminal is made of, for example, aluminum or aluminum alloy. On the other hand, the negative electrode terminal 40 is arranged at the other side (right side in FIG. 2 and FIG. 3) in the long side direction Y of the sealing plate 14. The negative electrode terminal 40 as described above is electrically connected at the outside of the battery case 10 to a negative electrode outside conductive member 42 formed in a plate shape. It is preferable that the negative electrode terminal 40 is made of metal, or it is further preferable that the negative electrode terminal is made of, for example, copper or copper alloy. The negative electrode terminal 40 may be configured by joining two conductive members to be integrated. For example, a later-described portion connected to the negative electrode collecting member 60 may be made of copper or copper alloy, and a portion exposed on the outside surface of the sealing plate 14 may be made of aluminum or aluminum alloy. In addition, a metal (aluminum, aluminum alloy, copper, copper alloy, or the like) having an outstanding electrically conductive property can be suitably used even for the electrode collecting member (positive electrode collecting member 50 and negative electrode collecting member 60).

The positive electrode outside conductive member 32 and the negative electrode outside conductive member 42 are members on which a bus bar is disposed, when plural secondary batteries 100 are electrically connected to each other. It is preferable that the positive electrode outside conductive member 32 and the negative electrode outside conductive member 42 are made of metal, or it is further preferable that the positive electrode outside conductive member and the negative electrode outside conductive member are made of, for example, aluminum or aluminum alloy. However, the positive electrode outside conductive member 32 and the negative electrode outside conductive member 42 are not essential, and may be omitted in another embodiment.

(4) Electrode Collecting Member

As shown in FIG. 3 to FIG. 6, regarding the secondary battery 100 in accordance with the present embodiment, plural (here, three) wound electrode assemblies 20 are accommodated in the battery case 10. Although a detailed structure will be described later, a positive electrode tab group 23 and a negative electrode tab group 25 are provided on each of the wound electrode assemblies 20. The above-described positive electrode terminal 30 is connected via the positive electrode collecting member 50 to each positive electrode tab group 23 of the plural wound electrode assemblies 20. In particular, the positive electrode collecting member 50 is accommodated inside the battery case 10. As shown in FIG. 3 and FIG. 6, this positive electrode collecting member 50 includes a positive electrode first electrical collector part 51 that is a plate-shaped conductive member extending in the long side direction Y along an inside surface of the sealing plate 14, and includes plural positive electrode second electrical collector parts 52, each of which is a plate-shaped conductive member extending along the vertical direction Z. Then, a lower end part 30c of the positive electrode terminal 30 is inserted into the battery case 10 through a terminal taking out hole 18 of the sealing plate 14, and is connected to the positive electrode first electrical collector part 51 (see FIG. 3). On the other hand, as shown in FIG. 5 to FIG. 7, regarding this secondary battery 100, positive electrode second electrical collector parts 52 whose number corresponds to the number of the wound electrode assemblies 20 are provided. Positive electrode second electrical collector parts 52 are respectively connected to the positive electrode tab groups 23 of the plural wound electrode assemblies 20. Then, each of the positive electrode tab groups 23 of the plural wound electrode assemblies 20 is folded and bent to make the positive electrode second electrical collector part 52 and one side surface 20e of the wound electrode assembly 20 be opposed to each other. By doing this, a top end part of the positive electrode second electrical collector part 52 and the positive electrode first electrical collector part 51 are electrically connected.

On the other hand, the negative electrode terminal 40 is connected via the negative electrode collecting member 60 to each negative electrode tab group 25 of the plural wound electrode assemblies 20. The connecting structure at the negative electrode side as described above is approximately the same as the connecting structure at the above-described positive electrode side. In particular, the negative electrode collecting member 60 includes a negative electrode first electrical collector part 61 that is a plate-shaped conductive member extending in the long side direction Y along the inside surface of the sealing plate 14 and includes plural negative electrode second electrical collector parts 62 that are plate-shaped conductive members extending along the vertical direction Z (see FIG. 3 and FIG. 6). Then, a lower end part 40c of the negative electrode terminal 40 is inserted into the battery case 10 through the terminal taking out hole 19, and is connected to the negative electrode first electrical collector part 61 (see FIG. 3). On the other hand, the plural negative electrode second electrical collector parts 62 are respectively connected to the negative electrode tab groups 25 of the plural wound electrode assemblies 20 (see FIG. 5 to FIG. 7). Then, the negative electrode tab group 25 is folded and bent to make the negative electrode second electrical collector part 62 and the other side surface 20g of the wound electrode assembly 20 be opposed to each other. By doing this, a top end part of the negative electrode second electrical collector part 62 and the negative electrode first electrical collector part 61 are electrically connected.

(5) Insulating Member

Additionally, in this secondary battery 100, various insulating members are attached to inhibit the conduction between the electrode assembly group 200 and the battery case 10. Specifically, an outside insulating member 92 is disposed between the positive electrode outside conductive member 32 (negative electrode outside conductive member 42) and an outside surface of the sealing plate 14 (see FIG. 2 and FIG. 3). By doing this, it is possible to inhibit the positive electrode outside conductive member 32 or the negative electrode outside conductive member 42 from conducting with the sealing plate 14. In addition, a gasket 90 is attached to each of the terminals taking out holes 18, 19 of the sealing plate 14 (see FIG. 3). By doing this, it is possible to inhibit the positive electrode terminal 30 (or negative electrode terminal 40) inserted into the terminal taking out hole 18, 19 from conducting with the sealing plate 14. In addition, an inside insulating member 94 is arranged between the positive electrode first electrical collector part 51 (or negative electrode first electrical collector part 61) and an inside surface of the sealing plate 14. This inside insulating member 94 includes a plate-shaped base part 94a disposed between the positive electrode first electrical collector part 51 (or negative electrode first electrical collector part 61) and the inside surface of the sealing plate 14. By doing this, it is possible to inhibit the positive electrode first electrical collector part 51 or the negative electrode first electrical collector part 61 from conducting with the sealing plate 14. Furthermore, the inside insulating member 94 includes a protruding part 94b that protrudes from the inside surface of the sealing plate 14 to the electrode assembly group 200 (see FIG. 3 and FIG. 4). By doing this, it is possible to regulate the movement of the electrode assembly group 200 in the vertical direction Z, and direct contact between the electrode assembly group 200 and the sealing plate 14 can be prevented. Incidentally, a material of each insulating member described above is not particularly restricted, if having a predetermined insulating property. As an example, it is possible to use a synthetic resin material such as polyolefin type resin (example: polypropylene (PP), polyethylene (PE)), fluorine type resin (example: perfluoro alkoxy alkane (PFA), polytetrafluoroethylene (PTFE)), or the like.

Furthermore, the plural wound electrode assemblies 20 are accommodated inside the battery case 10 in a state of being covered by an electrode assembly holder 29 consisting of a resin sheet having an insulating property (see FIG. 4). By doing this, it prevents direct contact between the electrode assembly group 200 and the outer package 12. It is possible to prepare the electrode assembly holder 29, for example, by folding and bending a resin sheet, having an insulating property, and being made of a resin material, such as polyethylene (PE), to make the resin sheet be formed in a bag shape or a box shape. A thickness of the resin sheet configuring the electrode assembly holder 29, which is not particularly restricted, may be about 0.2 mm. It is preferable that the electrode assembly holder 29 as described above includes a slight dimensional space (clearance) after the plural (here, 3) wound electrode assemblies are accommodated. Alternatively, it is preferable that the electrode assembly holder is made from a flexible material. By doing this, each of the plural wound electrode assemblies 20 becomes in a state of including the peeled area being formed at the later described peeling step S20, and thus the electrode assembly holder 29 is not damaged even when the thickness is slightly increased.

(6) Electrode Assembly Group

As shown in FIG. 4, the electrode assembly group 200 here includes three wound electrode assemblies 20. However, the number of the wound electrode assemblies arranged inside one outer package 12 is not particularly restricted, if being equal to or more than 2 (plural). The electrode assembly group 200 is disposed inside the outer package 12 in a direction in which the wound axis WL of each wound electrode assembly extends along the bottom wall 12a (in other words, in a direction in which the wound axis WL is parallel to the long side direction Y). In other words, the wound electrode assembly 20 is arranged inside the outer package 12, with the wound axis WL being in parallel to the bottom wall 12a and being in a direction orthogonal to the shorter side wall 12c. An end surface of the wound electrode assembly 20 (in other words, laminate surface on which the positive electrode plate 22 and the negative electrode plate 24 are laminated, or an end surface in the long side direction Y of FIG. 8) is opposed to the shorter side wall 12c. In other words, "wound axis direction" described in the following explanation is a direction approximately the same as the long side direction Y in drawings.

As shown in FIG. 8, the wound electrode assembly 20 includes a positive electrode plate 22 and a negative electrode plate 24. The wound electrode assembly 20 here is a flat shaped electrode assembly in which the positive electrode plate 22 formed in a strip-like shape and the negative electrode plate 24 formed in a strip-like shape are laminated via a separator 26 formed in a strip-like shape to be wound about a wound axis WL treated as the center.

As shown in FIG. 4, the wound electrode assembly 20 includes a pair of bent parts 20r whose outer surfaces are bent, and includes a flat part 20f which couples the pair of bent parts 20r and whose surface is flat. A pair of bent parts 20r are respectively opposed to the bottom wall 12a and the sealing plate 14. One (upper side in FIG. 4) of the bent parts 20r here is indirectly opposed to the sealing plate 14, via the positive electrode first electrical collector part 51, the negative electrode first electrical collector part 61, the inside insulating member 94, or the like. The other one (lower side in FIG. 4) of the bent parts 20r is indirectly opposed to the bottom wall 12a, via the electrode assembly holder 29.

The wound electrode assembly 20 preferably has a long length in the wound axis direction and a low height (length in the vertical direction Z) in view of high capacity of the battery or effective use of space when mounted on a vehicle or the like. On the other hand, in the wound electrode assembly 20 whose length in the wound axis direction is longer and whose height is shorter, the electrolyte solution is hardly impregnated into the central part in the wound axis direction and thus the impregnation tends to be not-uniform. Therefore, an effect of the herein disclosed technique works further suitably. The length of the wound electrode assembly 20 in the wound axis direction is, for example, preferably equal to or more than 20 cm, or further preferably equal to or more than 25 cm. The height H1 (see FIG. 4) of the wound electrode assembly 20 is preferably equal to or less than 12 cm, or further preferably equal to or less than 10 cm. Incidentally, the height of the wound electrode assembly 20 means a length in a direction perpendicular to the wound axis direction and to the thickness direction (short side direction X) of the wound electrode assembly 20.

As shown in FIG. 8, the positive electrode plate 22 is a member formed in a long strip-like shape. The positive electrode plate 22 includes a positive electrode substrate 22c, and includes a positive electrode active material layer 22a and positive electrode protective layer 22p, fixed at least one surface of the positive electrode substrate 22c. However, the positive electrode protective layer 22p is not essential, and may be omitted in another embodiment. The positive electrode substrate 22c is formed in a strip-like shape. The positive electrode substrate 22c consists, for example, of an electrically conductive metal, such as aluminum, aluminum alloy, nickel, and stainless steel. The positive electrode substrate 22c here is a metal foil, specifically, an aluminum foil. In addition, an average thickness of the positive electrode substrate 22c is not particularly restricted. For example, the average thickness is preferably 2 μm to 30 μm, further preferably 2 μm to 20 μm, or furthermore preferably 5 μm to 15 μm.

At one end part (left end part in FIG. 8) of the positive electrode substrate 22c in the long side direction Y, plural positive electrode tabs 22t are provided. The plural positive electrode tabs 22t protrude to one side (left side in FIG. 8) in the long side direction Y. The plural positive electrode tabs 22t protrude in the long side direction Y more than the separator 26. The plural positive electrode tabs 22t are provided at intervals (intermittently) along a longitudinal direction of the positive electrode plate 22. However, the positive electrode tab 22t may be provided at the other end part (right end part in FIG. 8) in the long side direction Y. or may be provided at both end parts in the long side direction Y. The positive electrode tab 22t is a part of the positive electrode substrate 22c and consists of a metal foil (aluminum foil). At least a part of the positive electrode tab 22t fails to include the positive electrode active material layer 22a and the positive electrode protective layer 22p, but includes the positive electrode substrate 22c being exposed.

As shown in FIG. 8, the positive electrode active material layer 22a is provided in a strip-like shape along a longitudinal direction of the positive electrode substrate 22c formed in a strip-like shape. The positive electrode active material layer 22a contains a positive electrode active material that can reversibly store and release a charge carrier (for example, lithium transition metal composite oxide, such as lithium-nickel-cobalt-manganese composite oxide). When a total solid content of the positive electrode active material layer 22a is treated as 100 mass %, the positive electrode active material may occupy approximately 80 mass % or more, typically 90 mass % or more, or, for example, 95 mass % or more. The positive electrode active material layer 22a may contain an arbitrary component other than the positive electrode active material, for example, an electrical conducting material, a binder, various additive components, or the like. As the electrical conducting material, for example, it is possible to use a carbon material, such as acetylene black (AB). As the binder, for example, it is possible to use polyvinylidene fluoride (PVdF), or the like.

As shown in FIG. 8, the positive electrode protective layer 22p is provided at a boundary portion between the positive electrode substrate 22c and the positive electrode active material layer 22a in the long side direction Y. The positive electrode protective layer 22p here is provided at one end part (left end part in FIG. 8) of the positive electrode substrate 22c in the long side direction Y. However, the positive electrode protective layer 22p may be provided at both end parts in the long side direction Y. The positive electrode protective layer 22p is provided in a strip-like shape along the positive electrode active material layer 22a. The positive electrode protective layer 22p contains an inorganic filler (for example, alumina). When a total solid content of the positive electrode protective layer 22p is treated as 100 mass %, the inorganic filler may occupy approximately 50 mass % or more, typically 70 mass % or more, or, for example, 80 mass % or more. The positive electrode protective layer 22p may contain an arbitrary component other than the inorganic filler, for example, an electrical conducting material, a binder, various additive components, or the like. The electrical conducting material and the binder may be the same as ones illustrated as components capable of being contained in the positive electrode active material layer 22a.

As shown in FIG. 8, the negative electrode plate 24 is a member formed in a long strip-like shape. The negative electrode plate 24 includes a negative electrode substrate 24c, and includes a negative electrode active material layer 24a fixed on at least one surface of the negative electrode substrate 24c. The negative electrode substrate 24c is formed in a strip-like shape. The negative electrode substrate 24c consists of, for example, an electrically conductive metal, such as copper, copper alloy, nickel, and stainless steel. The negative electrode substrate 24c here is a metal foil, specifically, a copper foil.

At one end part (right end part in FIG. 8) of the negative electrode substrate 24c in the long side direction Y, plural negative electrode tabs 24t are provided. The plural negative electrode tabs 24t protrude to the long side direction Y, more than the separator 26. The plural negative electrode tabs 24t are provided at intervals (intermittently) along a longitudinal direction of the negative electrode plate 24. The negative electrode tab 24t protrudes to one side (right side in FIG. 8) in the long side direction Y. However, the negative electrode tab 24t may be provided at the other end part (left end part in FIG. 8) in the long side direction Y, or may be provided at both end parts in the long side direction Y. The negative electrode tab 24t is a part of the negative electrode substrate 24c and consists of a metal foil (copper foil). At a part of the negative electrode tabs 24t, a negative electrode active material layer 24a is disposed. At least a part of the negative electrode tab 24t fails to include the negative electrode active material layer 24a and includes the negative electrode substrate 24c being exposed.

As shown in FIG. 8, the negative electrode active material layer 24a is provided in a strip-like shape along the longitudinal direction of the strip-like shaped negative electrode substrate 24c. The negative electrode active material layer 24a contains a negative electrode active material (for example, carbon material, such as graphite) that can reversibly store and release a charge carrier. When a total solid content of the negative electrode active material layer 24a is treated as 100 mass %, the negative electrode active material may occupy approximately 80 mass % or more, typically 90 mass % or more, or, for example, 95 mass % or more. The negative electrode active material layer 24a may contain an arbitrary component other than the negative electrode active material, for example, a binder, a dispersing agent, various additive components, or the like. As the binder, for example, rubbers, such as styrene butadiene rubber (SBR) can be used. As the dispersing agent, for example, celluloses, such as carboxymethyl cellulose (CMC) can be used.

It is preferable that a width W1 of a main body part of the negative electrode plate 24 excluding the negative electrode tabs 24t is equal to or more than 20 cm. The width W1 of the main body part of the negative electrode plate 24 is, for example, preferably 20 cm to 45 cm, or further preferably 25 cm to 35 cm. In the battery including a relatively larger main body part as described above, the higher capacity is implemented but the electrolyte solution is hardly permeated to the inside of the wound electrode assembly 20. Thus, an effect of the herein disclosed technique works furthermore. Incidentally, the width of the main body part of the negative electrode plate means a length in the short direction of the strip-shaped negative electrode plate.

Figure 9:
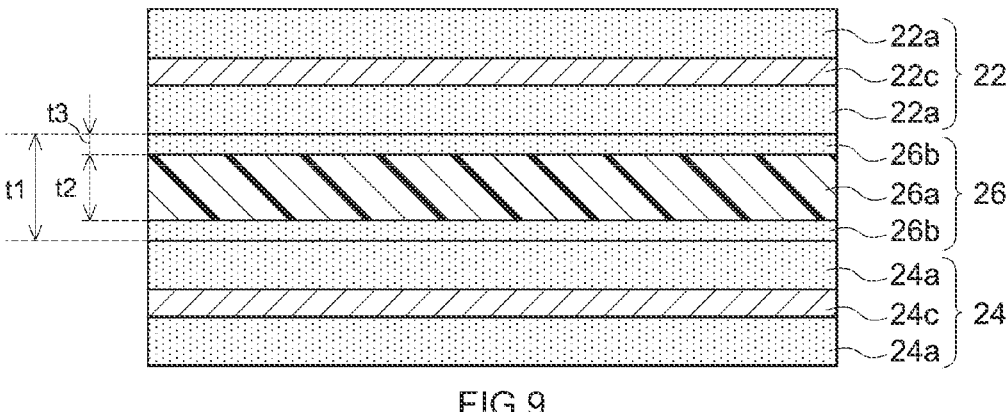
FIG. 9 is a view that schematically shows a boundary between a positive electrode, a negative electrode, and a separator of the wound electrode assembly of the secondary battery in accordance with one embodiment.

As shown in FIG. 8, the wound electrode assembly 20 includes two separators 26. Each of the separators 26 is a member that insulates the positive electrode active material layer 22a of the positive electrode plate 22 and the negative electrode active material layer 24a of the negative electrode plate 24. The separator 26 configures an outer surface of the wound electrode assembly 20. FIG. 9 is a view that schematically shows a boundary between the positive electrode plate 22 and negative electrode plate 24 of the wound electrode assembly 20 and the separator 26. The separator 26 in the present embodiment includes a base material layer 26a formed in a strip-like shape, and includes an adhesion layer 26b arranged on a surface (both surfaces) of the base material layer 26a. In the present embodiment, one adhesion layer 26b and the positive electrode plate 22 of the separator 26 having the above configuration are adhered, and the other adhesion layer 26b and the negative electrode plate 24 are adhered. By doing this, it suppresses the flat part 20f (see FIG. 4) of the wound electrode assembly 20 from expanding in the thickness direction (short side direction X), and thus, it becomes easy to insert even the electrode assembly group 200 including the plural wound electrode assemblies 20 into the battery case 10 at the later described arranging step S10.

A thickness t1 (see FIG. 9) of the separator 26 is, for example, preferably 5 μm to 40 μm, further preferably 8 μm to 30 μm, or furthermore preferably 12 μm to 20 μm. Incidentally, as shown in FIG. 9, "thickness 11 of the separator 26" in the present specification means a total thickness with respect to the base material layer 26a and the adhesion layer 26b, and means a thickness before a press molding process if not particularly mentioned.

Regarding the base material layer 26a, it is possible to use one used for a separator of a conventionally known secondary battery, without restriction. For example, it is preferable that the base material layer 26a is a porous sheet made of resin consisting of polyolefin resin, such as polyethylene (PE) and polypropylene (PP). Although not particularly restricted, a thickness t2 (see FIG. 9) of the base material layer 26a is, for example, preferably 4 μm to 35 μm, further preferably 8 μm to 25 μm, or furthermore preferably 10 μm to 20 μm. In addition, a void rate of the base material layer 26a is, for example, preferably 20% to 70%, or further preferably 30% to 60%. By doing this, it is possible to properly move the charge carrier between the positive electrode plate 22 and the negative electrode plate 24. Incidentally, "thickness of the base material layer 26a" and "void rate of the base material layer 26a" in the present specification respectively represent a thickness and a void rate before the press molding process, if not particularly mentioned.

As shown in FIG. 9, the adhesion layers 26b in the present embodiment are layers arranged on both surfaces of the base material layer 26a. The adhesion layer 26b contains a binder and an inorganic particle. Incidentally, the adhesion layers 26b may be configured similarly or differently at a side opposed to the positive electrode plate 22 and at a side opposed to the negative electrode plate 24. Incidentally, it is preferable that the separator 26 includes a porous base material layer 26a made of a polyolefin resin and the both surfaces are the adhesion layers 26b. It is preferable that the adhesion layer 26b contains polyvinylidene fluoride (PVdF). Another layer may be arranged between the adhesion layer 26b and the base material layer 26a.

As the binder contained in the adhesion layer 26b, it is possible without restriction to use a conventionally known resin material having a constant adhesive property. As the binder of the adhesion layer 26b, it is preferable to use a thermoplastic resin, for example, a fluorine type resin, such as polyvinylidene fluoride (PVdF) and polytetrafluoroethylene (PTFE); a polyester resin, such as polyethylene terephthalate; a polyamide type resin; a polyimide type resin; an acrylic resin; or the like. In addition, the adhesion layer 26b may contain two or more types of these binder resins. Incidentally, among the binder resins described above, PVdF is preferably used because of suitably inducing an adhesive property with respect to the electrode plate. When the adhesion layer 26b is treated as 100 mass %, a content amount of the binder contained in the adhesion layer 26b is preferably equal to or more than 10 mass %, further preferably equal to or more than 15 mass %, and furthermore preferably equal to or more than 20 mass %. Although not particularly restricted, an upper limit of the content amount of the binder contained in the adhesion layer 26b, for example, may be equal to or less than 50 mass %, equal to or less than 45 mass %, or equal to or less than 40 mass %. By making the binder contained in the adhesion layer 26b be within the above-described range, it is possible to induce a suitable adhesive property. Incidentally, it is preferable that the positive electrode plate 22 and negative electrode plate 24, and the adhesion layers 26b are adhered, for example, by press. The press can be performed, for example, at a room temperature, or in a heated state.

Examples of the inorganic particles include ceramic particles containing ceramics such as alumina, boehmite, aluminum hydroxide, titania, magnesium carbonate, magnesia, zirconia, zinc oxide, iron oxide, ceria, and yttria as main components. It is preferable that a content amount of the inorganic particle of the adhesion layer 26b is adjusted to induce a predetermined adhesive property with respect to the positive electrode plate 22 (or negative electrode plate 24).

In addition, it is preferable that the adhesion layer 26b includes a three-dimensional net structure having plural voids. In the three-dimensional net structure as described above, it is preferable that the inorganic particles are dispersed. For example, it is appropriate that the adhesion layer 26b may be configured such that a plurality of fiber-shaped PVdFs are randomly laminated so as to have multiple voids to form a three-dimensional network structure, and inorganic particles, such as alumina and boehmite are dispersed inside the three-dimensional network structure.

A thickness t3 of the adhesion layer 26b is, for example, preferably equal to or more than 0.5 μm, further preferably equal to or more than 1.0 μm, or furthermore preferably equal to or more than 1.5 μm. The thickness t3 of the adhesion layer 26b, which is not particularly restricted, for example, preferably equal to or less than 10 μm, further preferably equal to or less than 8 μm, or furthermore preferably equal to or less than 6 μm. By doing this, it is possible to induce a suitable adhesive property. In addition, a basis weight amount of the adhesion layer 26b is preferably equal to or more than 1 g/m², further preferably equal to or more than 2 g/m², or furthermore preferably equal to or more than 2.5 g/m². In addition, the basis weight amount of the adhesion layer 26b is, for example, preferably equal to or less than 8 g/m², further preferably equal to or less than 6 g/m², or furthermore preferably equal to or less than 5.5 g/m². In addition, a void rate of the adhesion layer 26b is preferably equal to or more than 10%, further preferably equal to or more than 30%, or furthermore preferably equal to or more than 50%. In addition, a void rate of the adhesion layer 26b is preferably equal to or less than 90%, or further preferably equal to or less than 80%. Incidentally, "thickness of the adhesion layer 26b" and "void rate of the adhesion layer 26b" in the present specification respectively represent a thickness and void rate before the press molding process, if not particularly mentioned.

2. Manufacturing Method of Secondary Battery

Above, a configuration of the secondary battery 100 being a manufacture object is explained. Next, while referring to FIG. 1, a manufacturing method of the above-described secondary battery 100 will be explained. As described above, the herein disclosed manufacturing method of the secondary battery is characterized by peeling off at least one, among the positive electrode plate 22 and the negative electrode plate 24 of each wound electrode assembly 20, from the separator 26 at the peeling step S20 to induce a state where the peeled area is formed on each of the plural wound electrode assemblies 20, and the other manufacturing processes may be like conventional ones.

(1) Arranging Step S10

An arranging step S10 is a step for arranging the electrode assembly group 200 as described above inside the battery case 10. In particular, at first, the electrode assembly group 200 (three wound electrode assemblies 20) as described above, the battery case 10 (outer package 12 and sealing plate 14), the positive electrode terminal 30, the negative electrode terminal 40, the positive electrode collecting member 50 (positive electrode first electrical collector part 51 and positive electrode second electrical collector part 52), and the negative electrode collecting member 60 (negative electrode first electrical collector part 61 and negative electrode second electrical collector part 62) are prepared. Then, the electrode assembly group 200 is inserted into the battery case 10.

(a) Winding Process

In a winding process, the positive electrode plate 22 and the negative electrode plate 24 are laminated via 2 sheets of separators 26 and then the resultant is wound to prepare the wound electrode assembly 20. In more detail, the separator 26 formed in a strip-like shape, the negative electrode plate 24 formed in a strip-like shape, the separator 26 formed in a strip-like shape, and the positive electrode plate 22 formed in a strip-like shape are laminated in this order so as to manufacture the laminate body (see FIG. 8). At that time, a laminate position of each sheet member in the long side direction Y is adjusted, to make only the positive electrode tabs 22t of the positive electrode plate 22 protrude from one side edge (left side in FIG. 8) in the long side direction Y and to make only the negative electrode tabs 24t of the negative electrode plate 24 protrude from the other side edge (right side in FIG. 8). Then, the manufactured laminate body is wound to manufacture a cylindrical body. It is preferable that a wound number at that time is suitably adjusted in consideration of the intended performance or manufacture efficiency for the target wound electrode assembly 20. As one example, the wound number of the positive electrode plate 22 on the wound electrode assembly 20 is preferably 10 to 60, or further preferably 30 to 40.

(b) Press Molding Process

In a press molding process, press molding is performed on the above manufactured cylindrical body, to prepare the flat-shaped wound electrode assembly 20. The press molding may be performed at a room temperature or may be performed at a heated state (for example, about 40° C. to 80° C.). When press molding is performed on the wound cylindrical body, an elastic effect remaining at a bent part 20r of the molded wound electrode assembly 20 may cause spring back which expands a thickness of the flat part 20f. The secondary battery 100 manufactured by the herein disclosed manufacturing method includes the plural wound electrode assemblies 20, and thus there are some fears that accommodation into the battery case 10 at a later described arranging process becomes difficult when the spring back is caused. However, according to the herein disclosed technique, the separator 26 includes an adhesion layer 26b having a predetermined adhesive property, and thus by performing the press molding on the wound electrode assembly 20 having the above-described adhesion layer 26b, the adhesion layer 26b of the separator 26 and the positive electrode plate 22 are suitably adhered and the adhesion layer 26b and the negative electrode plate 24 are suitably adhered, so that the spring back is suppressed. Therefore, it is possible to suitably accommodate the electrode assembly group 200 including the plural wound electrode assemblies 20 into the battery case 10.

On the other hand, when the positive electrode plate 22 and the negative electrode plate 24 are excessively adhered to the adhesion layers 26b, it may become difficult to respectively induce the peeled areas on the plural wound electrode assemblies 20 at the later described peeling step S20. Thus, it is preferable that a press pressure for pressing the wound cylindrical body at the press molding process is adjusted to form a suitable peeled area on each wound electrode assembly 20 at the peeling step. The press pressure should be different based on a property (for example, material or thickness) of the adhesion layer 26b, a size of the wound electrode assembly 20, or the like, thus should not be generalized, but may be preferably, for example, about 50 kN to about 400 kN. By doing this, the electrode assembly group 200 can be smoothly accommodated at the arranging step S10, and the peeled area can be easily formed on each wound electrode assembly 20 at the peeling step S20.

(b) Arranging Process

In an arranging process, the above prepared electrode assembly group 200 including the plural wound electrode assemblies 20 is accommodated into the battery case 10. At first, as shown in FIG. 6, a combined member is prepared in which the positive electrode collecting member 50, the negative electrode collecting member 60, and the sealing plate 14 are attached to the electrode assembly group 200. The positive electrode second electrical collector part 52 is joined to the positive electrode tab group 23 of the wound electrode assembly 20, and the negative electrode second electrical collector part 62 is joined to the negative electrode tab group 25. Then, as shown in FIG. 6, plural (here, 3) wound electrode assemblies 20 are arranged in parallel to make the flat parts 20f be opposed. Then, the sealing plate 14 is arranged upward the plural wound electrode assemblies 20, and the positive electrode tab group 23 of each wound electrode assembly is folded and bent to make each positive electrode second electrical collector part 52 and one side surface 20e of the wound electrode assembly 20 be opposed. By doing this, the positive electrode first electrical collector part 51 and the positive electrode second electrical collector part 52 are connected. Similarly, the negative electrode tab group 25 of each wound electrode assembly is bent such that each negative electrode second electrical collector part 62 faces the other side surface 20g of the wound electrode assembly 20. By doing this, the negative electrode first electrical collector part 61 and the negative electrode second electrical collector part 62 are connected. As this result, the electrode assembly group 200 is attached to the sealing plate 14 via the positive electrode collecting member 50 and the negative electrode collecting member 60.

Figure 10:
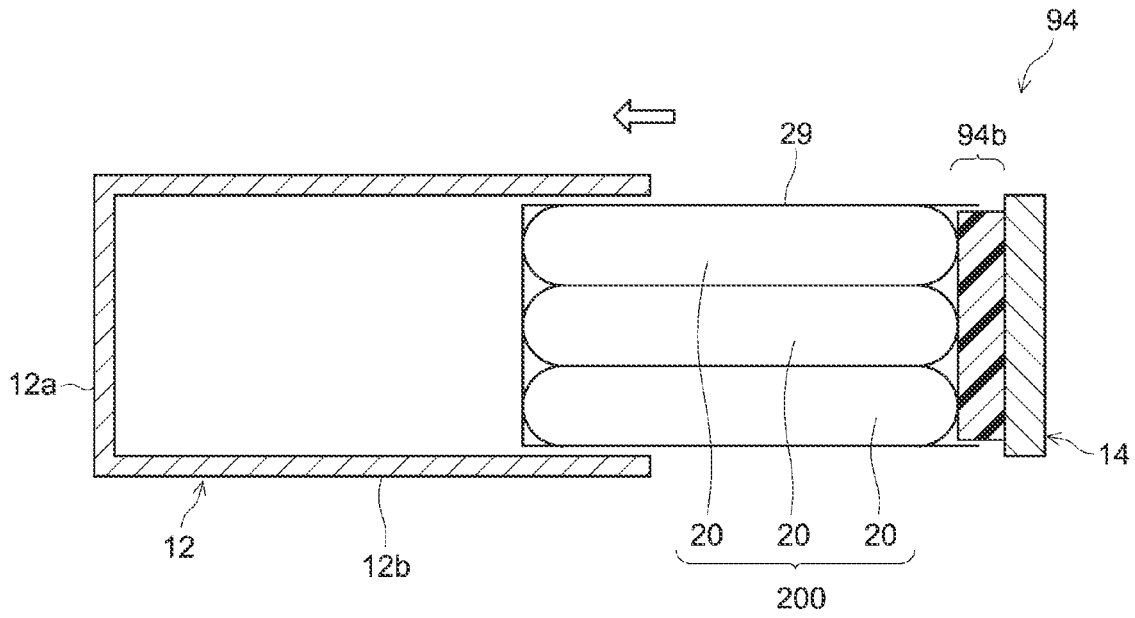
FIG. 10 is a cross section view that is for schematically explaining an arranging step in accordance with one embodiment.

The electrode assembly group 200 being attached to the sealing plate 14 is accommodated into the electrode assembly holder 29 (see FIG. 4). Then, the electrode assembly group 200 being covered by the electrode assembly holder 29 is inserted into the outer package 12. At that time, the wound axis WL is preferably inserted to be disposed inside the outer package 12 in a direction along the bottom wall 12a (in other words, a direction in which the wound axis WL is parallel to the long side direction Y). In addition, it is preferable that arrangement is performed so as to make the bent part 20r of the wound electrode assembly 20 at a lower end side come into contact with the bottom wall 12a of the battery case 10 via the electrode assembly holder 29. By doing this, it is possible to efficiently heat the electrode assembly group 200 at the later-described heating process. Although not particularly restricted, when a weight of the electrode assembly group 200 is heavy, or when the weight is approximately equal to or more than 1 kg, for example, equal to or more than 1.5 kg, or furthermore 2 to 3 kg, as shown in FIG. 10, arrangement may be performed to make the longer side wall 12b of the outer package 12 cross the gravity direction (making the outer package 12 be in sideways) and the electrode assembly group 200 may be inserted into the outer package 12.

Then, the sealing plate 14 is joined to an edge part of the opening 12h of the outer package 12 so as to seal the opening 12h. For example, it is preferable that the outer package 12 and the sealing plate 14 are sealed by welding and joining. Welding and joining the outer package 12 and the sealing plate 14 can be implemented, for example, by laser welding, or the like. By doing this, it is possible to prepare a battery assembly in which the electrode assembly group 200 is arranged inside the battery case 10.

(2) Peeling Step S20

A peeling step S20 is a step for generating a peeled area on each of the plural wound electrode assemblies 20 accommodated in the battery assembly prepared at the arranging step S10. The peeled area is an area where a contact surface with at least one, among the positive electrode plate 22 and the negative electrode plate 24, and the separator 26 is peeled off. Specifically, a later-described heating process and first decompressing process are performed for each wound electrode assembly 20 in a state where the positive electrode plate 22 and the separator 26 are adhered by the adhesion layer 26b, and the negative electrode plate 24 and the separator 26 are adhered by the adhesion layer 26b. By doing this, on each wound electrode assembly 20, the peeled area is generated between at least one, among the positive electrode plate 22 and the negative electrode plate 24, and the separator 26.

Here, it is preferable in the peeled area that a gap is generated between the positive electrode plate 22 or negative electrode plate 24 and the separator 26. The presence or absence of the peeled area can be determined from an X-ray CT image which is a cross section perpendicular to the wound axis WL at a central part of the wound electrode assembly 20 in the wound axis direction.

(a) Heating Process

The heating process is a process to soften the adhesion layer 26b of the separator 26 and facilitate peeling of the separator 26 from the positive electrode plate 22 and the negative electrode plate 24. It is preferable for the heating process as described above to uniformly heat so as to make temperatures of respective wound electrode assemblies 20 be approximately the same. By doing this, it becomes easy to form the peeled area on each of the wound electrode assemblies 20. It is preferable that a temperature of the heating process is held to make a temperature of each wound electrode assembly 20 be equal to or more than 80° C., although the temperature is different based on the kind of binder used in the adhesion layer 26b and thus it is difficult to define the temperature strictly. For example, regarding the heating process, the temperature of each wound electrode assembly 20 is held further preferably to be equal to or more than 90° C., or the temperature of each wound electrode assembly 20 is held furthermore preferably to be equal to or more than 100° C. When the temperature is too higher, it is thought that a not-intended side reaction is generated inside the secondary battery 100 to deteriorate the battery characteristic, and thus it is not preferable. Thus, regarding the temperature of the heating process, the temperature of each wound electrode assembly 20 is held, for example, preferably to be equal to or less than 130° C., or further preferably to be equal to or less than 120° C. A temperature rising speed, which is not particularly restricted, may be set, for example, about 4° C./min to 8° C./min.

In addition, a time for the heating process may be, for example, about 1 hour to 6 hours, or can be set about 1.5 hours to 4 hours, although being different based on a size or the like of the secondary battery 100 and thus it is difficult to strictly define the time for the heating process. As one example, it is preferable that the heating process is held for 1 hour or more in a state where the temperature of each wound electrode assembly 20 is held to be equal to or more than 80° C., or further preferable that the heating process is held for 1 hour or more in a state where the temperature of each wound electrode assembly 20 is held to be 90° C. or more.

The means for heating is not particularly limited as long as each of the wound electrode assemblies 20 can be heated almost uniformly. The means for heating may be implemented, for example, by placing the battery assembly on a based-shaped heating plate in which the electric heater is stored. Alternatively, regarding the heating means, the battery assembly may be disposed silently in a thermostatic chamber, or the like, which is set to hold a predetermined temperature, to perform heating.

(b) First Decompressing Process

The first decompressing process is a process for decompressing the inside of the battery assembly after the heating process to be lower than the atmospheric pressure (in other words, the pressure of air outside the battery assembly), and separating the positive electrode plate 22 and negative electrode plate 24 from the separator 26. Regarding the first decompressing process, by setting the decompression speed faster than conventional one, it is possible to suitably generate a gap between the positive electrode plate 22 and negative electrode plate 24 of each wound electrode assembly 20 and the separator 26, so as to form the peeled area on each wound electrode assembly 20.

The decompression speed at the first decompressing process is set to be a relatively faster speed than conventional one as described above, and preferably set to be equal to or more than at least 30 kPa/min. For example, the decompression speed is further preferably equal to or more than 40 kPa/min, or furthermore preferably equal to or more than 50 kPa/min. An upper limit of the decompression speed is not particularly restricted, but the decompression speed is preferably equal to or less than 500 kPa % min, further preferably equal to or less than 250 kPa/min. or furthermore preferably equal to or less than 100 kPa/min. In addition, the pressure inside the battery assembly is, based on the absolute pressure, preferably decompressed to be equal to or less than 1 kPa, further preferably decompressed to be equal to or less than 100 Pa, or furthermore preferably decompressed to be equal to or less than 50 Pa. By performing the first decompressing process under the condition as described above, it is possible to peel off the positive electrode plate 22 and negative electrode plate 24 of each wound electrode assembly 20 and the separator 26, and to generate the peeled area on each wound electrode assembly 20. By doing this, the liquid injection time at the later-described liquid injection step S30 can be shortened, even when the plural wound electrode assemblies 20 are accommodated in the battery case 10. In addition, the impregnations of the electrolyte solution between the wound electrode assemblies can be suppressed from becoming not-uniform. Therefore, the shortage of the electrolyte solution inside the electrode assembly can be improved in all of the plurality of wound electrode assemblies 20 accommodated in the battery case 10. In addition, it is possible to improve the reduction in the battery characteristic caused by lithium precipitation, or the like, and thus it is possible to manufacture a battery having a higher capacity and a higher reliability.

A time for holding the decompressed state as described above is not particularly restricted, but, for example, may be about 1 hour to 8 hours, or can be about 1 hour to 5 hours. In addition, a timing for starting the first decompressing process is not particularly restricted. It is preferable from a perspective of forming the peeled area on each of the plural wound electrode assemblies 20 to start the first decompressing process after the plural wound electrode assemblies 20 are heated to be approximately uniform by the heating process. Regarding the first decompressing process, decompression is typically preferred to be started when about 2 hours or more have passed since the heating process is started, or, for example, decompression is preferably started when about 4 hours have passed since the heating process is started.

The first decompressing process is not particularly limited as long as the first decompressing process is carried out so as to satisfy the above condition. The reduced pressure may be reduced by, for example, discharging a gas from the inside of the battery case 10. For example, one of the nozzles is attached to the liquid injection hole 15 of the sealing plate 14, and the other one is connected to a vacuum pump. By driving the vacuum pump in this state, the gas inside the battery assembly can be exhausted from the liquid injection hole 15 so as to decompress the inside of the battery assembly.

(3) Pressurizing Step

A pressurizing step is a step for pressurizing (return-pressurizing) the inside of the battery assembly, decompressed by the first decompressing process, to an extent of the atmospheric pressure. This pressurizing step is not a step essential for the herein disclosed technique, and can be suitably omitted. For example, a liquid injection step S30 described later (further particularly, a liquid injecting process) may be performed after the above-described first decompressing process. By performing the pressurizing step under the following condition after the peeling step S20, it is possible to keep the peeled area in a preferable state on each of the plural wound electrode assemblies 20.

It is enough for the pressurizing step that the pressure inside the battery assembly is typically pressurized (return-pressured) to an extent of the atmospheric pressure, for example, preferably pressurized to be equal to or more than 5 kPa based on the absolute pressure, or further preferably pressurized to be equal to or more than 10 kPa. In addition, the upper limit is not particularly restricted, but the pressure inside the battery assembly is preferably pressurized to be equal to or less than 200 kPa based on the absolute pressure, or further preferably pressurized to be equal to or less than 100 kPa. It is preferable for the pressurizing (return-pressuring) speed at that time to perform pressurizing relatively slower in order to inhibit the wound electrode assembly 20 peeled off at the peeling step S20 from being re-adhered. Although being different based on the size of the battery assembly, or the like, and not being generalized, the pressurizing speed is preferably set, for example, to be 5000 Pa/min to 80000 Pa/min.

When the pressurizing step is performed, it is enough to use a method capable of controlling relative slow pressurizing as described above, and the pressurizing means is not particularly restricted. For example, one of the nozzles is attached to the liquid injection hole 15 of the sealing plate 14, and the other is connected to a tank in which the gas is stored. By controlling and introducing the gas, stored in the tank, into the battery assembly under this state, it is possible to perform pressurizing (return-pressurizing) to the extent of the atmospheric pressure. The gas introduced here may be similar to a conventional one, and may be, for example, an inert gas, such as nitrogen ($N_2$), a dry air, or the like.

(4) Liquid Injection Step S30

A liquid injection step S30 is a step for performing liquid injection of the electrolyte solution to the inside of the battery assembly. In the herein disclosed technique, the peeled area is formed in each of the wound electrode assembly 20 by the peeling step S20 described above, and by injecting the electrolyte solution into the electrode assembly group 200 having the wound electrode assembly 20 in this state, it is possible to suppress the shortening of the injection time of the electrolytic solution and the impregnation of the electrolytic solution into the entire electrode assembly group 200 from becoming uneven.

(a) Second Decompressing Process

A second decompressing process is a process for decompressing the inside of the battery assembly, when the above-described pressurizing step is performed, in order to suitably perform the later-described liquid injecting process. This second decompressing process is a process not essential for the herein disclosed technique, and can be suitably omitted. For example, the later-described liquid injecting process may be performed after the above-described first decompressing process is performed (in other words, w % bile the decompression state is kept). In addition, after the pressurizing step, the later-described liquid injecting process may be performed without the second decompressing process. When the pressurizing step has been performed, it is possible by performing the second decompressing process to perform the liquid injecting process under a state in which the battery assembly is decompressed. By doing this, it is possible to shorten the time required for the liquid injecting process. In addition, it is preferable because the electrolyte solution easily permeate into the wound electrode assembly 20.

The second decompressing process is not particularly restricted, if the inside of the battery assembly is decompressed to suitably perform the liquid injecting process. For example, the pressure inside the battery assembly may be decompressed to be about 5 kPa to 50 kPa, based on the absolute pressure. The time for holding the decompressed state can be set, for example, to be about 100 seconds to 400 seconds. In addition, the decompression speed can be preferably set, for example, to be 1 kPa/min to 800 kPa/min. Incidentally, a means for decompressing at the second decompressing process is not particularly limited, and the decompression may be performed used the same means as the above-described first decompressing process.

(b) Liquid Injecting Process

A liquid injecting process is a process for performing liquid injection of the electrolyte solution to the inside of the battery assembly. The liquid injecting process may be performed under the atmospheric pressure environment, or may be performed under a reduced-pressure environment. It is preferable that the liquid injecting process is performed under the reduced-pressure environment. Thereby, the electrolyte solution can be injected faster. In the liquid injecting process, the electrolyte solution is injected so that the electrolyte solution distributes over the whole of the wound electrode assembly 20. For this liquid injecting process, it is possible to suitably use a conventionally-known electrolyte solution liquid injection apparatus. Incidentally, at that time, as a pressure feeding gas available for performing pressure feeding on the electrolyte solution, it is possible to use an inert gas, such as nitrogen ($N_2$), dry air, or the like, similarly to conventional one. After the liquid injection of the electrolyte solution, the liquid injection hole 15 of the sealing plate 14 of the battery assembly is sealed. Sealing the liquid injection hole 15 can be performed by assembling a sealing member 16 whose shape is fit for the liquid injection hole 15. By doing this, it is possible to construct the sealed secondary battery 100.

(5) Initial Charging Step

In the manufacturing method herein disclosed, it is possible to preferably perform an initial charging step after the above-described liquid injection step S30. Further preferably, the initial charging step should be performed in a state where the above-constructed secondary battery 100 is restricted. Restricting the secondary battery 100 can be performed by adding a predetermined amount of load to a longer side wall 12b (see FIG. 2) of the outer package 12 along a short side direction X. A condition for the initial charge may be like conventional one. For example, regarding the secondary battery 100, in the restricted state, a cycle for charging and discharging with a charge rate whose battery drive voltage range is 0.1 to 2C would be performed about 1 to 5 times. As described above, the secondary battery 100 can be manufactured The herein disclosed manufacturing method can be used preferably, for example, for a high capacity type and sealed type battery including plural electrode assemblies. In addition, although the secondary battery 100 manufactured by the manufacturing method as described above can be used for various purposes, the secondary battery can be suitably used, for example, as a power source (driving power supply) for a motor mounted on a vehicle, such as a passenger car and a truck. The kind of the vehicle is not particularly restricted, but it is possible to use it, for example, on a plug-in hybrid electric vehicle (PHEV), a hybrid electric vehicle (HEV), a battery electric vehicle (BEV), or the like. In addition, the secondary battery 100 can be suitably used to construct a battery pack.

TEST EXAMPLE

Below, test examples regarding the present disclosure will be described. However, it is not intended that the present disclosure is limited to such test examples.

1. Arranging Step

A mass ratio of $LiNi_{1/3}Co_{1/3}Mn_{1/3}O_2$ as a positive electrode active material, acetylene black (AB) as an electrical conducting material, and polyvinylidene fluoride (PVdF) as a binder was weighed to be 97.5:1.5:1.0. These materials were dispersed into N-methyl pyrrolidone (NMP) being as the solvent, so that a paste-like composition for forming a positive electrode active material layer was prepared. This composition was applied on both surfaces of a strip-like shaped positive electrode substrate (aluminum foil) and then dried, to manufacture a strip-like shaped positive electrode plate including a positive electrode active material layer on the positive electrode substrate.

A mass ratio of natural graphite (C) as a negative electrode active material, styrene butadiene rubber (SBR) as a binder, and carboxymethyl cellulose (CMC) as a thickening agent was weighed to be 98.3:0.7:1.0. These materials were dispersed into an ion exchange water being as a solvent, so that a paste-like composition for forming a negative electrode active material layer was prepared. The composition was applied on both surfaces of a strip-like shaped negative electrode substrate (copper foil) and then dried, so as to manufacture a strip-like shaped negative electrode plate including a negative electrode active material layer on the negative electrode substrate.

In addition, as a separator, a member was used in which an adhesion layer including alumina powders and polyvinylidene fluoride (PVdF) were formed on a surface of a porous base material layer made of polyethylene (PE). Incidentally, regarding the separator, 2 kinds of separators with different basis weight amounts of adhesion layers were prepared.

The laminate body, in which the above manufactured strip-like shaped positive electrode plate and strip-like shaped negative electrode plate were laminated via the above prepared separator, was manufactured and then this laminate body was wound, so as to manufacture the cylindrical body. Then, a press molding process was performed on the laminate body having been wound, and this laminate body was crushed, so as to manufacture a wound electrode assembly formed in a flat shape. According to similar procedures, three wound electrode assemblies were manufactured. A positive electrode terminal and a negative electrode terminal were connected to these manufactured three wound electrode assemblies, and the resultant was arranged in the battery case including a liquid injection hole. By doing this, a battery assembly for evaluation, in which plural wound electrode assemblies were accommodated inside the battery case, was manufactured.

2. Peeling Step and Observation of Each Wound Electrode Assembly

In the present test, on the above-prepared battery assembly for evaluation, the peeling step was performed as the decompression speed of the first decompressing process was changed, and then the pressurizing step was performed.

Then, the presence or absence of the peeled area on each wound electrode assembly was confirmed.

(1) Example 1

At first, on the above-manufactured secondary battery assembly for evaluation, the heating process was performed under a condition whose highest temperature was 105° C. Next, the first decompressing process was performed, 4 hours later since the heating was started. The first decompressing process was performed to decompress the inside of the battery assembly for evaluation at a decompression speed 90 kPa/min to a pressure 10 Pa based on the absolute pressure, whose decompression keeping time was during 4 hours. After the first decompressing process, the pressurizing step of pressurizing (restoring) to the atmospheric pressure was performed.

(2) Example 2

At first, on the above-manufactured secondary battery assembly for evaluation, the heating process was performed under a condition whose highest temperature was 105° C. Next, the first decompressing process was performed, 4 hours later since the heating was started. The first decompressing process was performed under the same conditions as in Example 1. After the first decompressing process, the pressurizing step of pressurizing (restoring) to the atmospheric pressure was performed. The basis weight amount of the adhesion layer of the separator used in the Example 2 was smaller than a basis weight amount of the adhesion layer of the separator in the Example 1.

(3) Comparative Example 1

At first, on the above-manufactured secondary battery assembly for evaluation, the heating process was performed under a condition whose highest temperature was 105° C. Next, the first decompressing process was performed, 4 hours later since the heating was started. The first decompressing process was performed under the same conditions as in Example 1, except that the decompression speed was changed to 10 kPa/min. After the first decompressing process, the pressurizing step of pressurizing (restoring) to the atmospheric pressure was performed. The separator used in the Comparative Example 1 was the same as the separator of Example 1.

(4) Comparative Example 2

At first, on the above-manufactured secondary battery assembly for evaluation, the heating process was performed under a condition whose highest temperature was 105° C. Next, the first decompressing process was performed, 4 hours later since the heating was started. The first decompressing process was performed under the same conditions as in Example 1, except that the decompression speed was changed to 10 kPa/min. After the first decompressing process, the pressurizing step of pressurizing (restoring) to the atmospheric pressure was performed. The basis weight amount of the adhesion layer of the separator used in the comparative Example 2 was smaller than a basis weight amount of the adhesion layer of the separator in the Example 1.

(5) Obtaining X-Ray CT Image

At the central part of each wound electrode assembly (central part in the wound axis direction) of the above prepared examples and comparative examples, a cross section perpendicular to the wound axis was captured by an X-ray CT apparatus (made by Toshiba IT & Control Systems Corporation) and thus X-ray CT images for each example and each comparative example were obtained. Then, on the X-ray CT image, the presence or absence of peeled area at the flat part 20f of the wound electrode assembly 20 was confirmed. On the flat part 20f of the wound electrode assembly 20, a distance between a center in a thickness direction of one positive electrode plate 22 among 2 layers of positive electrode plates 22 arranged adjacent in the laminate direction of the positive electrode plates 22 and a center in the thickness direction of the other positive electrode plate 22 was represented by a distance D (μm). A total thickness of respective members disposed between the above-described two centers (total thickness of a half of the thickness of one positive electrode plate 22, a thickness of one separator 26, a thickness of the negative electrode plate 24, a thickness of the other separator 26, and a half of the thickness of the other positive electrode plate 22) was represented by a thickness T (μm). Then, a portion whose distance D (μm) was 30 μm or larger than the thickness T (μm) was determined to include the peeled area. One in which the peeled areas were formed on all of three wound electrode assemblies was represented by "Excellent". In addition, one in which the peeled area failed to be confirmed on some of three wound electrode assemblies was represented by "Poor". Results are shown in Table 1.

3. Liquid Injection Step

On each example and each comparative example whose peeling step conditions were changed as described above, the liquid injection step was performed. The electrolyte solution used for the liquid injection step was prepared by dissolving 1.1 mol/L concentration of $LiPF_6$ as a supporting salt into a mix solvent containing ethylene carbonate (EC), ethyl methyl carbonate (EMC), and dimethyl carbonate (DMC) at a volume ratio satisfying EC:EMC:DMC=3:4:3. At the liquid injection step, the second decompressing process was performed to decompress the inside pressure of the battery assembly for evaluation to 5 kPa based on the absolute pressure, and then, the liquid injecting process was performed to implement the liquid injection of the above-described electrolyte solution.

At the liquid injection step, a time to completion of the liquid injection was measured. Ratio of liquid injection time for each example or each comparative example, when the liquid injection time for Comparative Example 2 is treated as 1, is shown in Table 1.

TABLE 1

|  | Decompression speed (kPa/min) | Peeled area forming state | Liquid injection time ratio |
| --- | --- | --- | --- |
| Example 1 | 90 | Excellent | 0.44 |
| Example 2 | 90 | Excellent | 0.4 |
| Comparative Example 1 | 10 | Poor | 1.2 |
| Comparative Example 2 | 10 | Poor | 1 |

4. Test Result

At the peeling step, it is understood that the liquid injection times of the practical Examples 1 and 2, in which peeled areas were formed on all of the plural wound electrode assemblies, are extremely shorter, in comparison with the comparative example. This is estimated that, by performing the first decompressing process at the relatively faster decompression speed as described above, the peeled area was formed on each wound electrode assembly, and thus the electrolyte solution became to be easily impregnated. Therefore, by forming the peeled area on each of the plural wound electrode assemblies at the peeling step, it is possible to manufacture a secondary battery having a higher capacity and having a enhanced liquid injection property for a whole of the battery.

Incidentally, on the flat part $20f$ of the wound electrode assembly 20, one positive electrode active material layer $22a$, one separator 26, the negative electrode plate 24, the other separator 26, and the other positive electrode active material layer $22a$, which are disposed between respective positive electrode substrates $22c$ included by 2 layers of positive electrode plates 22 adjacent in the laminate direction, are treated as one unit. Regarding an unit in which the peeled area is formed on at least one among a boundary surface between the positive electrode plate 22 and the separator 26 arranged in this unit and a boundary surface between the negative electrode plate 24 and the separator 26 arranged in this unit, it is preferable that 3 or more units are formed at the flat part $20f$ of the wound electrode assembly 20, or it is preferable that 5 or more units are formed at the flat part of the electrode assembly. When a total laminate number of the positive electrode plates 22 is N, it is preferable that 0.1 N or more of the units where the peeled areas are formed at the flat part $20f$ of one wound electrode assembly 20 are formed, or it is further preferable that 0.2 N or more of the units where the peeled areas are formed at the flat part of one electrode assembly are formed.

Regarding the cross section perpendicular to the wound axis on the central part of the wound electrode assembly 20 in the wound axis direction, a width of the peeled area is preferably equal to or more than 10 mm, further preferably equal to or more than 20 mm, or furthermore preferably equal to or more than 30 mm.

Regarding the cross section perpendicular to the wound axis on the central part of the wound electrode assembly 20 in the wound axis direction, when a width of the positive electrode plate 22 at the flat part $20f$ of the wound electrode assembly 20 is represented by width W2 (mm) and a width of the peeled area of one layer is represented by width W3 (mm), W3/W2 is preferably equal to or more than 0.1, further preferably equal to or more than 0.2, or furthermore preferably equal to or more than 0.3.

Incidentally, among the plural wound electrode assemblies 20, a number of units, in which the peeled area was formed, of the wound electrode assembly having the smallest number of the peeled area formed units is represented by A. and a number of units, in which the peeled area was formed, of the wound electrode assembly having the largest number of the peeled area formed units is represented by B. In that case, it is preferable that the value of B/A is 1 to 5. Thereby, not-uniform impregnation of the wound electrode assembly 20 with the electrolyte solution is more effectively suppressed. Incidentally, the value of B/A is further preferably 1 to 3, or furthermore preferably 1 to 2.

Although the present disclosure is explained above in details, the above-described explanation is merely an illustration. In other words, the herein disclosed technique contains ones in which the above-described specific examples are deformed or changed.

What is claimed is:

1. A manufacturing method of a secondary battery comprising a wound electrode assembly which is formed in a flat shape and in which a positive electrode and a negative electrode are wound via a separator, and a battery case that is configured to accommodate a plural number of the wound electrode assemblies, the manufacturing method comprising:

an arranging step for arranging the plural number of the wound electrode assemblies inside the battery case;

a peeling step for peeling off at least one, among the positive electrode and the negative electrode of each of the plural number of the wound electrode assemblies, and the separator; and a liquid injection step for performing a liquid injection of an electrolyte solution into the battery case, wherein the peeling step includes a decompressing process for decompressing an inside of the battery case, the decompressing process decompresses a pressure inside the battery case at a speed equal to or more than 30 kPa/min, and at the peeling step, at least one, among the positive electrode and the negative electrode of each wound electrode assembly, and the separator are peeled off to induce a state where a peeled area is formed on each of the plurality of the wound electrode assemblies.

2. The manufacturing method of the secondary battery according to claim 1, wherein adhesion layers are formed on both surfaces of the separator.

3. The manufacturing method of the secondary battery according to claim 2, wherein at the arranging step, the wound electrode assembly in which the positive electrode and the separator are adhered by the adhesion layer and the negative electrode and the separator are adhered by the adhesion layer is arranged in the battery case.

4. The manufacturing method of the secondary battery according to claim 2, wherein the separator comprises a base material layer that is porous and made from polyolefin resin, and the adhesion layer comprises polyvinylidene fluoride (PVdF).

5. The manufacturing method of the secondary battery according to claim 1, wherein a width of the negative electrode is equal to or more than 20 cm.

6. The manufacturing method of the secondary battery according to claim 1, wherein the battery case comprising:

a square shape outer package comprising a bottom wall, a pair of first side walls that extend from the bottom wall and are opposed mutually, a pair of second side walls that extend from the bottom wall and are opposed mutually, and an opening that is opposed to the bottom wall; and a sealing plate configured to seal the opening, wherein at the arranging step, the wound electrode assembly is disposed such that a wound axis of the wound electrode assembly is oriented along the bottom wall.

7. The manufacturing method of the secondary battery according to claim 1, further comprising an initial charging step for performing an initial charge of the secondary battery after the liquid injection step, wherein the initial charging step is performed in a state where the secondary battery is restricted.

* * * * *